Patented Nov. 2, 1937

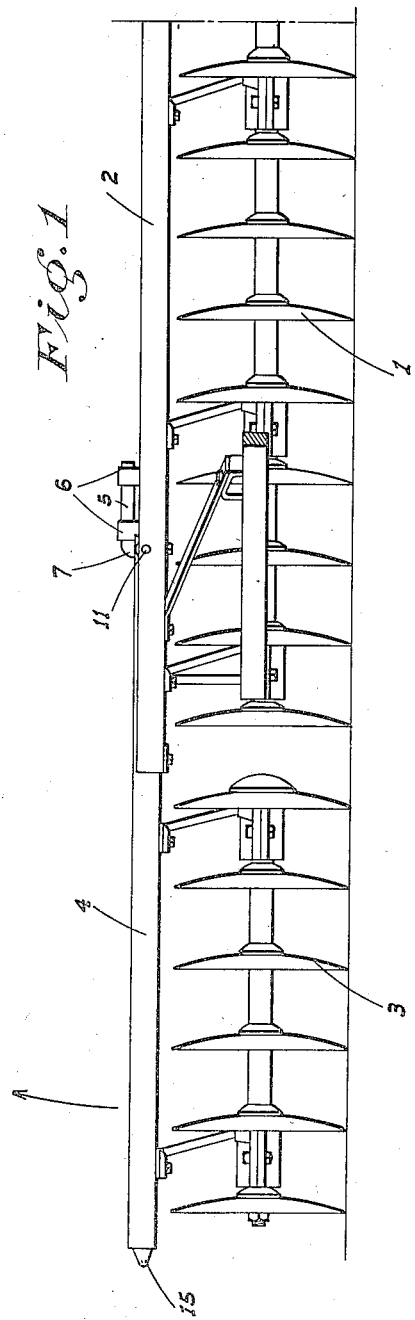
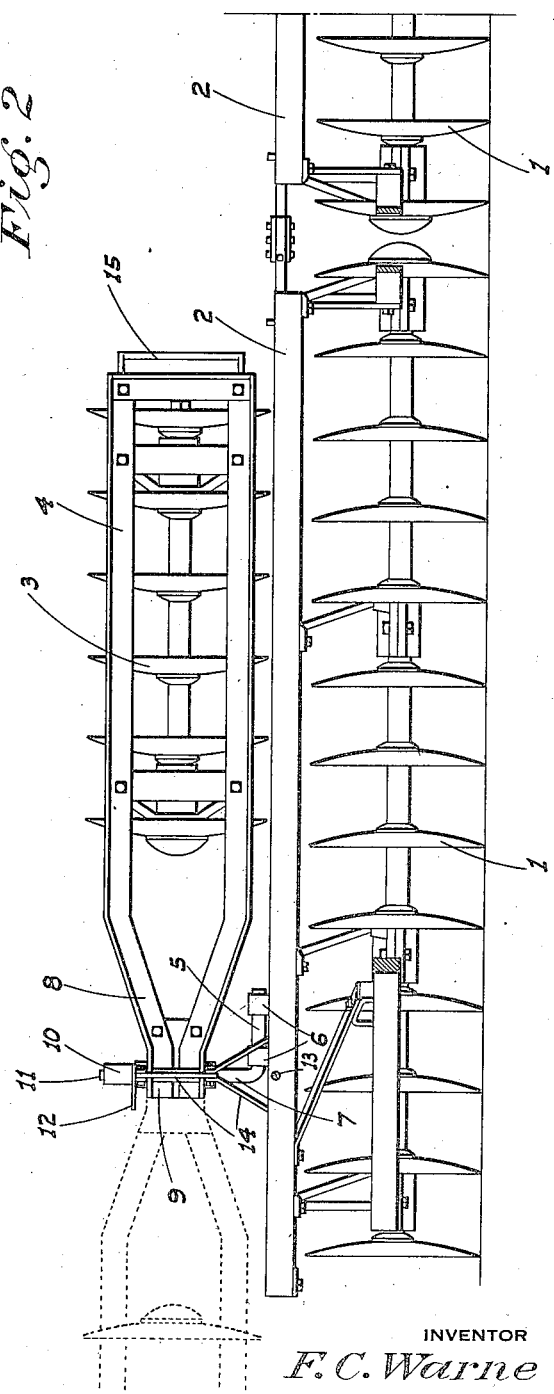

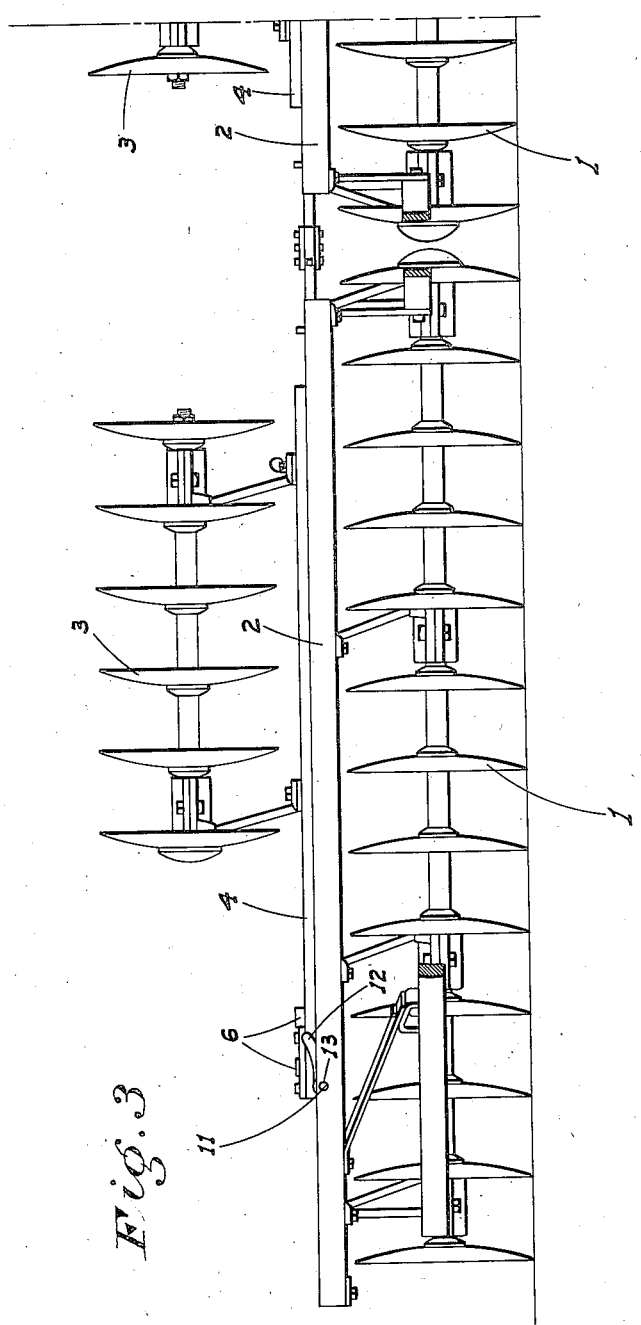

2,098,116

UNITED STATES PATENT OFFICE 2,098,116

DISK HARROW

Frederick C. Warne, Mansfield, Ohio, assignor to Farm Tools, Inc., Mansfield, Ohio, a corporation of Indiana Application September 23, 1936, Serial No. 102,107

10 Claims. (Cl. 55—81)

This invention relates to the disk harrow art and particularly to a disk harrow of that type in which each of the gangs are arranged in sections whereby there is provided a wide type harrow which may be reduced in width for purpose of transport or other purposes, by removing the outer extensions or sections from operative position.

The primary object of the present invention is to provide an extension disk gang pivotally connected to and interlocked with the main disk gang in such a manner that said extension may be first rocked in a vertical plane to disengage it from interlocking connection with the main gang and thereafter such extension may be swung on a horizontal plane to carry it around to a position parallel to and above the main gang whereupon it may be again rocked in a vertical plane and laid down on top of the main section where it will be out of the way for transport or other purposes.

Sectionalized disk gangs have heretofore been disclosed in which the extension gang has been connected to the main gang by a transverse horizontal pivot providing a means whereby the extension could only be swung upwardly and lifted bodily in a vertical plane and folded upwardly over and upon the main gang. However since the sections are very heavy this construction and method of handling the extension is very awkward and impracticable and my invention provides a means for handling the extension and finally locating it on the main gang with a minimum of effort and in a practicable and effective manner.

A further object of the invention is to provide a means for interlocking main and extension gangs together to prevent any vertical rocking movement between the two when in operative position but which locking means is releasable when the extension is to be moved from operative position to its position on top of the main gang the interlocking means then again functioning to prevent relative movement between the main and extension gangs.

Still another object of the invention is to provide a folding stop means between the main and extension gangs to support the hinged pivotal connection between the two when the extension gang has been rocked vertically and while it is being swung horizontally.

A further object of the invention is to provide means for carrying forth the other objectives through the instrumentality of a simple and inexpensive but practical mechanical set up.

These several objects I accomplish through the medium of the novel combination and arrangement of parts set out in the following specification and claims and the drawings accompanying the same in which drawings:

Figure 1 is a front elevation of one sectional disk gang showing the extension gang in operative position.

Figure 2 is a front elevation of one sectional disk gang and a portion of the opposite gang and showing one extension gang as it appears after it has been rocked vertically from operative position and swung horizontally ready to be laid down on the main gang section. The dotted lines in this view show the position of the extension gang after it has been rocked vertically and before it has been swung around horizontally.

Figure 3 is a front elevation similar to that shown in Fig. 2 after the sectional gangs have been rocked down to rest on top of the main gangs.

I will describe in detail the structure of one sectional gang it being understood that the sectional gang on the opposite side of the draft member is of like construction.

Referring now more particularly to the characters of reference on the drawings, the numeral 1 designates the main gang having the usual upper channel frame 2.

3 is the extension gang which also has an upper channel frame 4. When the sections are in working position the frame 3 fits within the frame 2 as shown in Fig. 1 so as to strengthen the connection between the two and avoid strains and stresses on the hinged pivotal connections between the two.

The inner end of the extension gang 3 has a hinged pivotal connection with the main gang 1 which permits of the vertical rocking movement and the horizontal swinging movement. This connection comprises a hinge pin 5 mounted on one side flange of the channel shaped frame 2 by means of straps 6 or other desired mounting means. This hinge pin 5 is also located at the necessary distance inwardly of the outer end of the main gang 1 to allow of the desired interlocking of the frames 2 and 4.

Integral with the hinge pin 5 and at right angles thereto is the pivot pin 7.

The inner end of the frame 4 is preferably pinched down to form a Y-shaped yoke 8 the stem 9 of which is pivotally mounted on the pivot pin 7, for free swinging movement thereon.

On the free end of the pivot pin is a cam latch 10 comprising the latch pin 11 and operating handle 12.

When the extension gang 3 is in working position, with the frames 2 and 4 interlocked, relative movement between the two is prevented by operating the cam handle 12 to project the latch pin 11 into an orifice 13 in the adjacent flange of the frame 2.

When, however, the extension gang 3 is to be released from working position and placed on top of the main frame 1 the pin 12 is withdrawn from the orifice 13. The extension gang 3 and the connected pin 7 and associated parts are then rocked in a vertical plane to bring the extension gang to a position at right angles to working position as shown by the dotted lines in Fig. 2. When in this position a toggle link 14 which is interposed between the pin 7 and a flange of the frame 2 prevents further undesired rocking movement and holds the pin 7 in vertical position while the extension gang is swung horizontally to lie parallel with and above the main gang 1 as shown in full lines in Fig. 2. It will be noted therefore that this swinging action can be accomplished with but little physical exertion due to the easy pivotal connection between the extension gang and the pivot pin. If desired, any selected form of fixed or removable handle member 15 may be provided at the outer end of the extension disk frame 4 to facilitate both the rocking and swinging movement.

The extension gang having been swung to the position shown in Fig. 2 it is then only necessary to collapse or fold the toggle link 14 down between the flanges of the frame 2 and the hinge pin 5 then permits the extension gang to be rocked downwardly to come to rest on top of the gang 1 as shown in Fig. 3. The latch pin 11 is then again engaged with the orifice 13 and thus the parts are maintained in this position until it is desired to again move the extension gang to working position, whereupon the movements above described are merely reversed to accomplish this latter result.

From the foregoing description it will be quite apparent that I have produced in a sectionalized harrow a very simple and easily operated combination of parts whereby all of the objectives of the invention have been attained.

While of course I have described the preferred form of the invention in detail it will be understood that variations in such detail may be made without departing from the spirit of the invention as defined in the appended claims.

Having thus described my invention, what I claim as new and useful and desire to secure by Letters Patent is:

1. A sectionalized disk harrow comprising a main gang and an extension gang, means mounting the extension gang on the main gang in a manner to allow of the extension gang being first rocked in a vertical plane and then swung in a horizontal plane to a position parallel with and above the main gang, such means being then operable to lay the extension gang in an inverted position upon the main gang.

2. A sectionalized disk harrow comprising a main gang and an extension gang, means mounting the extension gang on the main gang in a manner to allow of the extension gang being first rocked in a vertical plane and then swung in a horizontal plane to a position parallel with and above the main gang, such means being then operable to lay the extension gang upon the main gang, and means for locking the gangs against relative movement in either position.

3. A sectionalized disk harrow comprising a main gang and an extension gang, and a hinged pivotal connection between the two and means to normally and releasably lock the extension and main gangs together to prevent relative movement thereof about said hinged pivotal connection.

4. A sectionalized disk harrow comprising a main gang and an extension gang, a hinged pin mounted on the main gang with its longitudinal axis substantially parallel with the longitudinal axis of such main gang, a pivot pin associated with the hinged pin at substantially right angles thereto, the inner end of the extension gang being pivotally mounted on the pivot pin.

5. A sectionalized disk harrow comprising a main gang and an extension gang, a hinged pin mounted on the main gang with its longitudinal axis substantially parallel with the longitudinal axis of such main gang, a pivot pin associated with the hinged pin at substantially right angles thereto, the inner end of the extension gang being pivotally mounted on the pivot pin, the said hinge and pivotal connections being positioned a distance inwardly of the outer end of the main gang to allow the channel frames of the two gangs to interlock when the gangs are in working position.

6. A sectionalized disk harrow comprising a main gang and an extension gang, a hinged pin mounted on the main gang with its longitudinal axis substantially parallel with the longitudinal axis of such main gang, a pivot pin associated with the hinged pin at substantially right angles thereto, the inner end of the extension gang being pivotally mounted on the pivot pin, and means for locking the pivot pin against hinge movement relative to the main gang.

7. A sectionalized disk harrow comprising a main gang and an extension gang, a hinged pin mounted on the main gang with its longitudinal axis substantially parallel with the longitudinal axis of such main gang, a pivot pin associated with the hinged pin at substantially right angles thereto, the inner end of the extension gang being pivotally mounted on the pivot pin, and means for locking the pivot pin against hinge movement relative to the main gang, such means comprising a cam latch pin operable for engagement with an orifice provided in the main gang frame.

8. A sectionalized disk harrow comprising a main gang and an extension gang, a hinged pin mounted on the main gang with its longitudinal axis substantially parallel with the longitudinal axis of such main gang, a pivot pin associated with the hinged pin at substantially right angles thereto, the inner end of the extension gang being pivotally mounted on the pivot pin, and a toggle link connected between the main gang frame and the pivot pin to limit the hinged movement of the latter.

9. A sectionalized disk harrow comprising a main gang and an extension gang, said gangs including separate frames normally disposed in longitudinal alinement, and a hinge and pivot means connecting said frames at their adjacent ends, said means including a hinge pin extending lengthwise of the main gang frame and turnably mounted thereon at one side thereof, and a pivot pin rigid with and at right angles to said hinge pin normally extending across the main gang frame, the extension gang frame being turnably mounted on the pivot pin.

10. A structure as in claim 9, in which the frame of the main gang includes spaced side members, and the frame of the extension gang is narrower than the spacing between said side members whereby to fit therebetween when the extension gang is swung and folded over onto the main gang.

FREDERICK C. WARNE.